United States Patent [19]

Steininger

[11] 4,224,154
[45] Sep. 23, 1980

[54] SWIMMING POOL CHEMICAL CONTROL SYSTEM

[76] Inventor: Jacques M. Steininger, 126 E. Haley St., No. A-16, Santa Barbara, Calif. 93101

[21] Appl. No.: 971,306

[22] Filed: Dec. 20, 1978

Related U.S. Application Data

[63] Continuation-in-part of Ser. No. 791,929, Apr. 28, 1977, abandoned.

[51] Int. Cl.² .................. C02B 3/08; G05D 11/08
[52] U.S. Cl. ................... 210/85; 210/96.1; 210/139; 210/142; 210/143; 210/169; 137/93
[58] Field of Search ............... 422/62; 307/293, 354, 307/360, 362; 137/5, 93; 210/62, 64, 85, 89, 90 R, 103, 105, 138, 139, 140, 198 R, 142, 143, 169, 141

[56] References Cited

U.S. PATENT DOCUMENTS

| | | | |
|---|---|---|---|
| 3,195,551 | 7/1965 | Russel | 137/5 |
| 3,376,883 | 4/1968 | Douty | 137/93 |
| 3,528,545 | 9/1970 | Frazel et al. | 210/96 |
| 3,554,212 | 1/1971 | Maroney | 137/93 |
| 3,648,080 | 3/1972 | Nakaya | 307/293 |
| 3,660,681 | 5/1972 | Vlaeminck | 307/293 |
| 3,682,131 | 8/1972 | Algeri | 307/293 |
| 3,697,879 | 10/1972 | Holliday | 307/293 |
| 4,016,079 | 4/1977 | Severin | 210/96 R |
| 4,033,871 | 7/1977 | Wall | 210/169 |

FOREIGN PATENT DOCUMENTS 1361292   7/1971   United Kingdom .................. 137/93

Primary Examiner—Ernest G. Therkorn

[57] ABSTRACT

The disclosed system for controlling the chemical balance of a body of liquid, such as a swimming pool, compares the output of a chemical balance sensor immersed in the liquid with a standard indicative of the desired chemical balance, then dispenses a chemical into the pool to adjust its balance towards the desired balance. A timer limits the duty cycle of the dispenser to a relatively short dispensing interval followed by a longer non-dispensing interval permitting the dispensed chemical to disperse throughout the pool, the sensing and dispensing cycle then being repeated if appropriate. Preferably, there are a plurality of sensors, comparators and dispensers, each dispenser having a timer to limit its duty cycle. Also, preferably an over-range alarm is employed to alert an attendant when the chemical balance of the pool departs from a given range. Further, preferably the system is adjustable permitting both the desired balance level and the water limits defining the given range to be simultaneously adjusted. The system may be employed with either a dry or liquid chemical dispenser.

4 Claims, 7 Drawing Figures

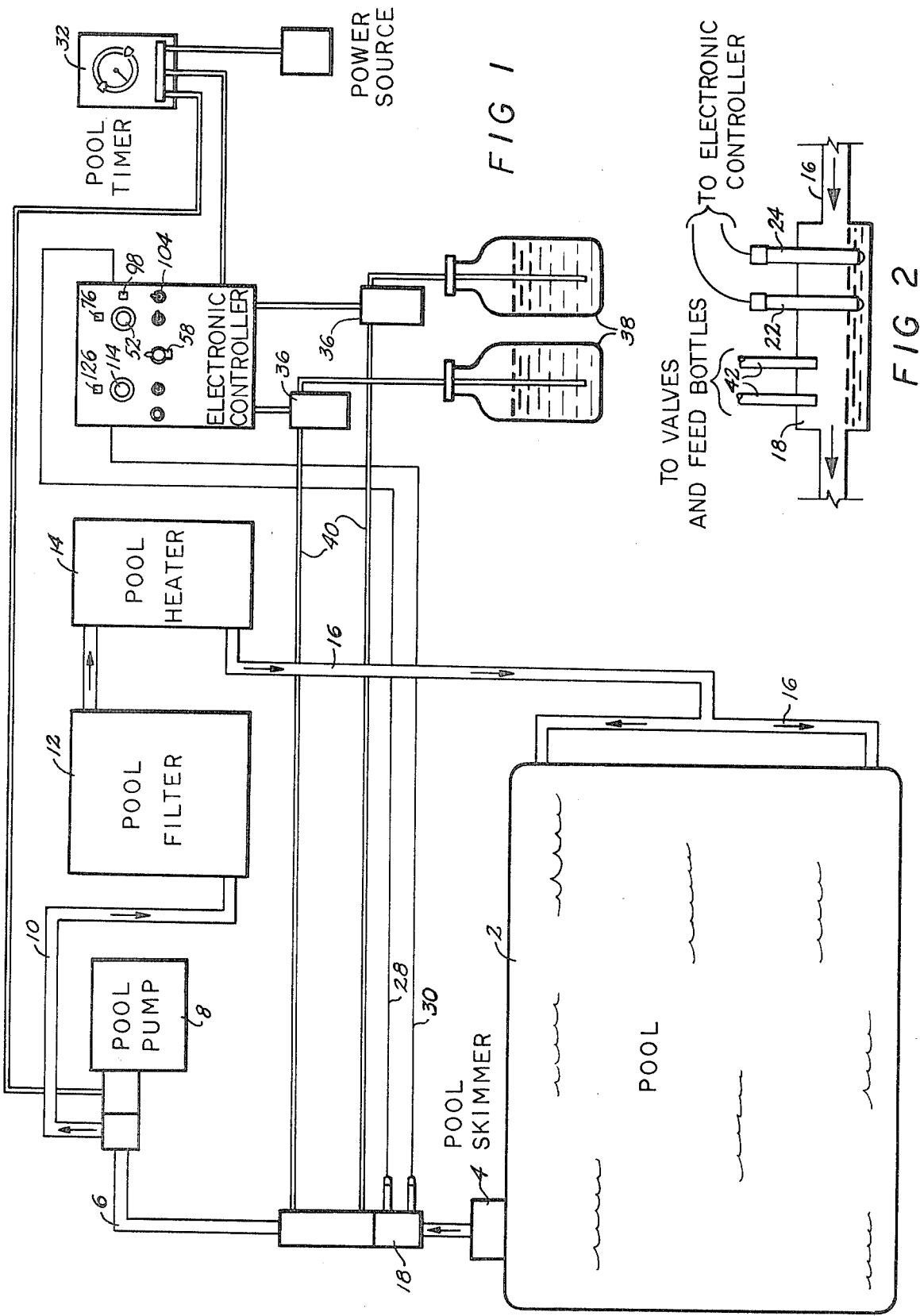

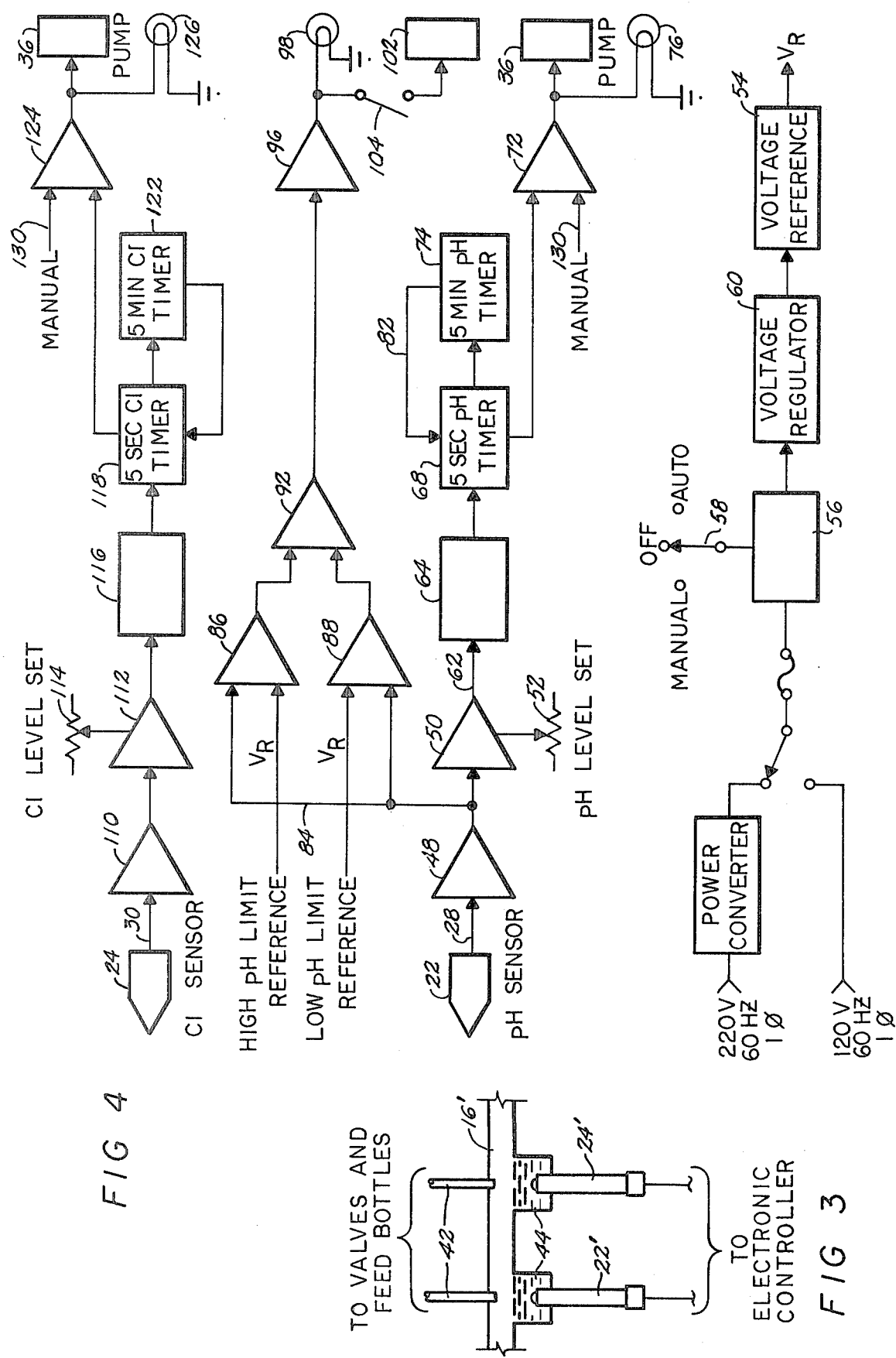

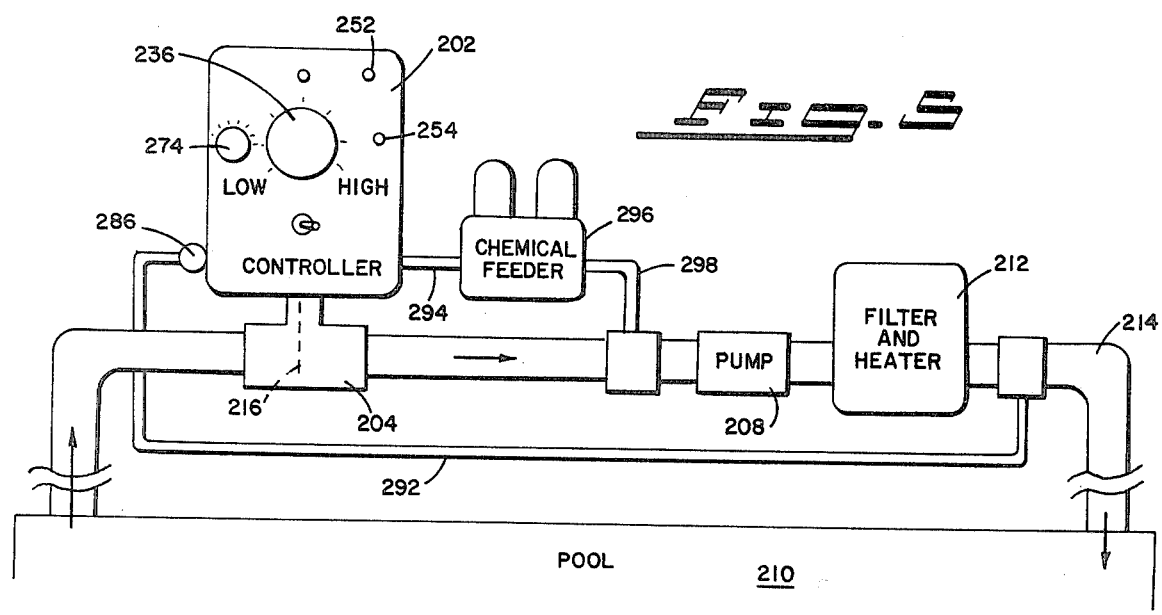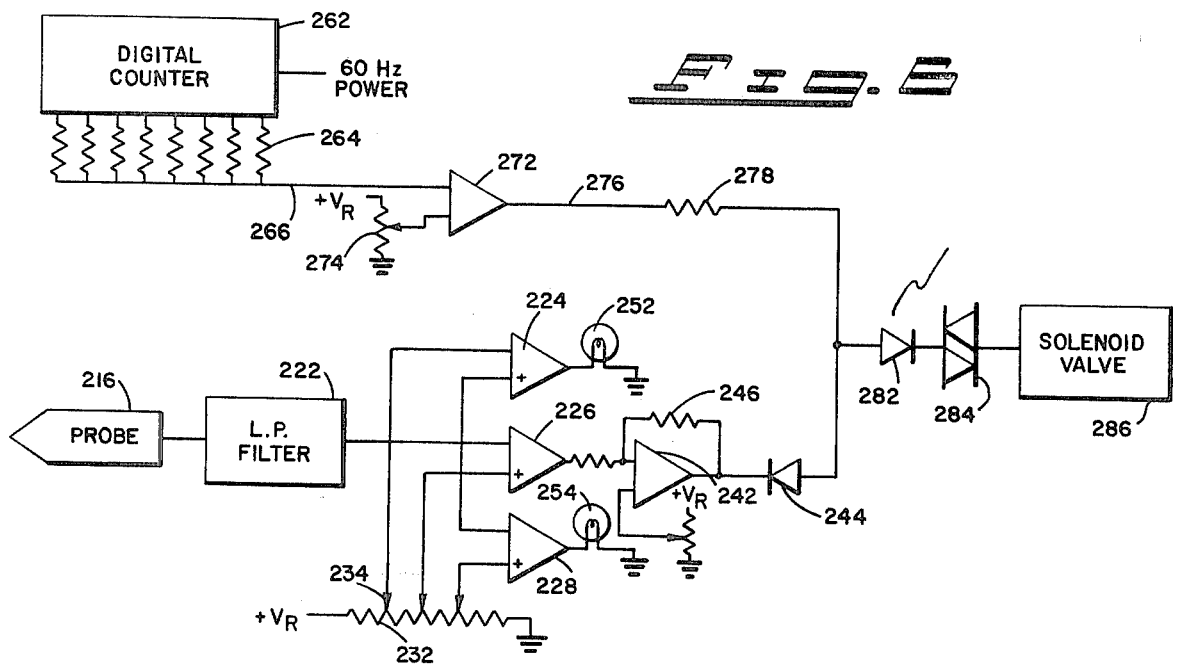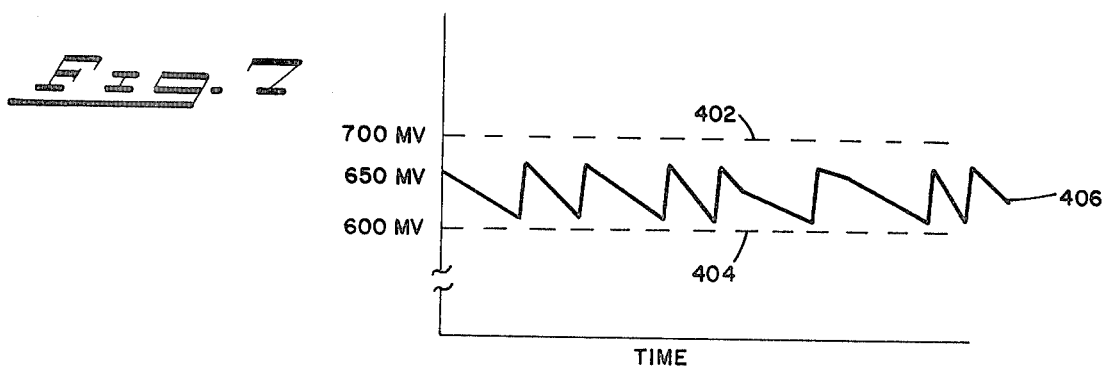

SWIMMING POOL CHEMICAL CONTROL SYSTEM

CROSS REFERENCE TO RELATED APPLICATIONS

This application is a continuation-in-part of application Ser. No. 791,929 filed Apr. 28, 1977, now abandoned, by the same applicant for a Swimming Pool Chemical Control System.

BACKGROUND OF THE INVENTION

The invention relates to a system for controlling the chemical balance of a body of liquid within a given range, preferably the chlorine and pH balance of a swimming pool.

Many systems have been designed for controlling the chemical balance of a swimming pool and the like. For the most part, simple, inexpensive systems performing this function automatically dispense pre-set amounts of chemicals into the pool at pre-set intervals. They do not sense or respond to the chemical condition of the pool, a condition which will vary dramatically with pool usage, weather, temperature, and other environmental factors. Thus, they easily can cause the chemical balance of the pool to depart considerably from the proper range. The more expensive, elaborate versions of such systems do sense the chemical balance of the pool, and dispense chemicals to maintain the balance of a pool with a given range. However, because of their elaborate nature such systems only are economical for large, heavily used pools.

Maintaining the chemical balance of a swimming pool is quite important. If the chemical balance departs from (drops below) a given range, unsanitary conditions will develop permitting algae and bacteria to grow and contaminate the pool. If such conditions exist for long, they may require the pool to be drained and acid washed. Improperly high chlorine and pH levels can cause eye and skin irritations to swimmers, as well as pipe corrosion or scaling to the recirculating system, giving rise to increased heating costs due largely to the resultant inefficiencies. Improper chemical balance also may waste costly chemicals.

There is a real need for an automatic chemical control system for a swimming pool, one which is relatively simple in construction yet sensitive and durable in operation. Such a system would provide significant safety and a real convenience to the pool owner, reducing his usage of pool chemicals and permitting him to leave the pool unattended for extended periods of time. The system described herein meets these objectives, as well as other objectives which will be apparent to those skilled in the art upon reading the following detailed description.

SUMMARY OF THE INVENTION

The disclosed system for controlling the chemical balance of a pool of liquid within a given range includes at least one sensor for continuously detecting the chemical balance of the liquid and producing an output indicative of that chemical balance. Means are connected to the output of the sensor to compare it to a standard indicative of the desired chemical balance in the pool, and to actuate dispensing means when the actual chemical balance departs substantially from the desired chemical balance, the dispensed chemicals adjusting the chemical balance of the pool towards the desired level. Timing means are provided to limit the duty cycle of the dispensing means to a relatively short dispensing interval, followed by a longer non-dispensing interval permitting the dispensed chemical to disperse throughout the pool, this delay ensuring that an excessive amount of chemical will not be dispensed into the pool, once the dispensing cycle begins, while the dispensed chemical is dispersing sufficiently to be sensed by the sensor.

Preferably the system is employed to control the chlorine and pH balance of a swimming pool; two sensors are used, one to detect the chlorine balance, the other to detect the pH balance. Comparator, dispenser and timer means are connected to each sensor to control the dispensing of the chemical intended to adjust the condition sensed by the associated sensor. Preferably, the system also includes means to detect an out-of-range condition and to actuate an out-of-range alarm upon occurrence of that condition to alert the pool attendant. Also, preferably manual means are provided for selectively overriding the control system and causing the actuating means to dispense a chemical. Further, preferably the system is adjustable, permitting both the desired balance level and the water limits defining the given range to be simultaneously adjusted. The system may be employed with either a dry or liquid chemical dispenser. A process for performing these operations also is disclosed.

BRIEF DESCRIPTION OF THE DRAWINGS

The invention will be further described in connection with the accompanying drawings in which:

FIG. 1 is a diagrammatic view of the preferred swimming pool chemical control system;

FIG. 2 is a view, partially in vertical cross-section, of a portion of the system;

FIG. 3 is a view in vertical cross-section of a modified structure similar to that shown in FIG. 2;

FIG. 4 is a schematic diagram of the electronic controller employed in the system;

FIG. 5 is a diagrammatic view of another preferred swimming pool chemical control system;

FIG. 6 is a schematic diagram of the electronic controller employed in the system shown in FIG. 5; and FIG. 7 is a graph illustrating the action of the controller shown in FIGS. 5 and 6.

DETAILED DESCRIPTION OF THE PREFERRED EMBODIMENT

Automatically controlling the chemical balance of a body of liquid within a given range is an important objective. As an example, for health and other reasons it is necessary to control the chlorine and pH balance of a swimming pool. While the disclosed systems automatically achieve that control, and will be described in connection with a swimming pool, either system may be employed to control the chemical balance of most any body of liquid. Indeed, the teachings presented in this disclosure may be employed to improve significantly other such systems, as will be apparent to those skilled in this field.

Illustrated in FIG. 1 is a typical swimming pool recirculating system, including a pool 2 incorporation a skimmer 4 through which water passes to a pipe 6 leading to a pump 8. Pump 8 when energized forces this water through line 10, filter 12, heater 14 and the water return line 16. In pipe 6 is an adapter 18, better shown in FIG. 2. This adapter section includes two electrodes, a first electrode 22 for measuring the pH of the liquid flowing past it, and a second electrode 24 for measuring the reduction-oxidation potential, and therefore the concentration of oxidizing agents such as chlorine, of the liquid flowing past it. While any of a wide variety of electrodes could be employed, electrode 22 may be electrode No. 39502, manufactured by the Beckman Instrument Corporation of Anaheim, Calif., and electrode 24 may be their platinum combination electrode No. 39156.

The signals from these electrodes are supplied to an electronic controller 26 over lines 28 and 30 respectively. As will be described presently, this controller preferably powered by the output of the pool timer 32 which simultaneously energizes the pool pump 8, compares the outputs of the electrodes to standards indicative of the desired pH and oxidizing (chlorine) balance of the pool. When the balance sensed by either electrode daparts from a given range, the controller energizes the appropriate solenoid valve 36 to cause the appropriate chemical to be fed from a chemical supply bottle 38 through line 40 to a pitot tube 42 within adapter 18. The water flowing through the intake line and past the pitot tubes 42 produces sufficient negative pressure within the tubes to, when the associated solenoid valve is open, draw chemical from the chemical supply container 38. Alternatively, instead of employing pitot tubes and solenoid valves, pumps may be used to positively force chemicals through supply lines 40 and into the liquid flowing through intake line 6. By adding the chemicals to the recirculation line, the flow within the line assists in mixing these chemicals, diluting them with the flowing liquid, and injecting them into the pool with a force sufficient to further rapidly dilute and disperse them. Wherever these liquids are injected, they should preferably be injected downstream of the sensors 22 and 24, although as will be apparent from the following description these chemicals in this system may be injected even upstream of the sensors.

Adapter 18 preferably is substantially larger than the pool return line 16, as shown in FIG. 2. Thus, when the pool pump is de-energized and liquid no longer flows through the pool return line, while some or all of the liquid in the pool return line 16 may be drained or siphoned back into the pool, there will be a pool of liquid trapped within adapter 18. Sensors 22 and 24 are positioned so that their active elements will be located within this pool of trapped liquid within the adapter, thereby always maintaining the active elements of the sensors in a liquid bath. This result may be achieved in a number of other ways, one of which is illustrated in FIG. 3 wherein sensors 22' and 24' are received within enlargements 44 provided in the return line 16', these enlargements being located on the lower portion of the recirculation line to trap liquid within them.

The electronic controller 26 is schematically illustrated in FIG. 4. As it shows, the output of the sensor 22, the pH sensor, is applied over line 28 and through a unity gain buffer amplifier 48 to a comparator 50. Also applied to this comparator is a voltage level determined by potentiometer 52 to which is applied a voltage reference from voltage reference source 54. This voltage reference source is powered by power distribution system 56 controlled by switch 58. When this switch 58 is in the "auto" position, power is applied to the voltage regulator 60 that produces and regulates the reference voltages. When the voltage produced by electrode 22 departs significantly from the voltage established by potentiometer 52, the comparator 50 produces an output on line 62 that in turn is amplified by an amplifier 64 and applied over line 66 to actuate a timer 68. Upon being so actuated, this timer produces an output that is applied both to the solenoid driver amplifier 72 and to a second, delay timer 74. This output continues for a predetermined duration causing amplifier 72 to drive solenoid 36 for that period. The output also may be applied to a light 76, signaling to the attendant operation of that portion of the system. The output of delay timer 74 is applied over line 82 to timer 68 and prevents actuation of that timer until a predetermined period has elapsed. Thus, upon actuation of timer 68 a cycle is initiated causing solenoid 36 to be opened for a predetermined period and then this system to be disabled for a longer, predetermined period. As an example, the cycle time of timer 68 may be five to ten seconds and the cycle time of timer 74 may be five to ten minutes. Accordingly, a chemical will be fed through solenoid 36 to the recirculation line of the system for five to ten seconds, then allowed to mix in the pool for five to ten minutes. If, after this second, longer period has elapsed, the output of sensor 22 continues to indicate that additional chemical is required, the cycle will be repeated, and this will continue to occur until the chemical balance within the pool has attained the desired level.

Should the chemical balance within the pool depart from the recommended safe level, it is desirable to indicate this condition to the attendant. For this purpose, the output of the buffer amplifier 48 also is applied over lines 84 to two out-of-range comparators, a high comparator 86 and a low comparator 88. To each of these comparators also is applied a reference voltage $V_r$ determined by voltage reference source 54, the high reference voltage being indicative, for example, of a pH reading of 7.8 and the low reference voltage being indicative of a pH reading of, for example, 7.0. Should either of these comparators determine a coincidence to exist, they produce an output which is applied to an "or" gate 92, then over line 94 to the over-range driver amplifier 96. This driver amplifier energizes an over-range light 98 and may energize a buzzer 102 through a switch 104 when that switch has been closed by the attendant. By these signals, a positive alarm condition will be indicated to the attendant alerting him to the fact that the system requires corrective action.

The output of the reduction-oxidation electrode 24 is applied over line 30 to a unity gain buffer amplifier 110 and then to a comparator 112 which compares it with a voltage reference established by potentiometer 114 to which is applied a reference voltage from voltage reference source 54. Upon a coincidence being detected by this comparator, it produces an output which is applied through amplifier 116 to actuate the timer 118. In a manner similar to timer 68, this timer both actuates a delay timer 122 and energizes a solenoid driver amplifier 124. Amplifier 124 produces an output that is applied to the solenoid 36 and preferably, to light 126 visually indicating to the attendant that this portion of the system is in operation. Timer 118 energizes the solenoid for a predetermined period or interval, such as five to ten seconds; timer 122 produces an output that is applied to timer 118 to inhibit its subsequent operation for a predetermined, longer non-dispensing interval, such as five to ten minutes, thereby permitting the chemical dispensed through solenoid 36 to disperse throughout the pool.

Either or both of the solenoids may be manually actuated by the attendant. To this end, appropriate manual switches are provided within the electronic controller 26, these switches producing a signal on the appropriate output lines 130 to energize either the pH solenoid amplifier 72 or the chlorine solenoid driver amplifier 124. This permits the attendant to manually override the system and inject a desired amount of chemical into the pool. It also permits him to test or flush the solenoid valves and lines 40 with water or another chemical as he desires.

As can be seen from the foregoing description, this system avoids over-feeding of chemicals to the pool, thereby automatically maintaining the proper chemical balance within the pool. To obtain this important result, the control unit is programmed to combine information produced by sensors 22 and 24 with the information from certain timers. One set of timers of short duration (timers 68 and 118) control the chemical delivery time to limit feeding of the chemicals to small amounts. These small amounts of chemicals therefore will be rapidly diluted in the flowing water and the pool. This reduces corrosion and damage to the pool equipment which can result from the addition of large quantities of concentrated chemicals, particularly strong acid solutions. It also reduces the chemical decomposition which would take place in strong solutions, particularly chlorine solutions. A second set of timers (timers 74 and 122), provides a time delay of longer duration. This delay allows time for dispersion and mixing of the chemicals in the pool water before additional feeding is allowed, if required. This feature is particularly important for the purpose of obtaining close control of the chemical balance in the pool because of the relatively long time cycle required to circulate the water and chemicals though the pool and filtering system. Without this second set of timers, the sensors would show an apparently slow response time and call for feeding of excessive amounts of chemicals. In other words, once either of the sensors had indicated a chemical deficiency to exist within the pool, its associated feed system would be activated and if no cycle timer system was incorporated this actuation would continue until a chemical balance condition had been established at that sensor that was again within the desired range. To establish such condition, the chemical initially fed to the pool would have to disperse within the pool and re-enter the re-circulating system in sufficient quantities to indicate a return to the desired chemical balance. The circulation time is quite long because of the large water volume of the pool, relative to the flow of the filtration system. During all of that time, chemicals would continue to be added to the pool. For that reason, without the second set of timers the sensors would show an apparently slow response time and cause the feeding of an excessive amount of chemicals. The combined actions of the sensors and timers therefore results in a smooth yet flexible reaction to changes in the chemical balance of the pool, changes caused by variations in usage, weather conditions, temperature and other factors. This system also is capable of maintaining the chemical balance of the pool within a narrow range while requiring a minimum amount of chemicals to do so.

The system has been successfully tested, controlling the feeding of liquid sodium hypochlorite and liquid hydrochloric acid to a 20,000 gallon swimming pool throughout a period of several months. Both the chlorine and pH levels of this pool were found to remain at all times near the ideal recommended levels (0.5 parts per million of free chlorine and a pH of 7.4) with no evidence of corrosion or other damage to the pool equipment.

These important results are achieved by a system that is very simple in construction and operation, one that easily may be incorporated in already constructed pools and one which by the use of solid state electronics can provide maintenance free operation for extended periods.

This system also lends itself to simple calibration techniques, even though sensors may be employed that produce considerably different outputs between units of the same model. Specifically, the system incorporates potentiometers 52 and 114 which may be adjusted by the pool attendant to establish the desired chemical balance over a wide range of sensor characteristics. This makes it possible for the attendant to initially adjust the controller to obtain the best chemical balance in his pool by one of two simple procedures.

The first procedure requires the pool attendant to preliminarily adjust the chemical levels in the pool by manual addition of chemicals and testing the pool with standard reagents until the ideal conditions have been obtained. Then the attendant energizes the controller by turning switch 58 from the "off" to the "auto" condition, both of potentiometers 52 and 114 first being set to their "low" range points. These settings then are progressively increased toward the "high" range until the associated delivery system is triggered open by the control unit. By slightly backing off the setting of the potentiometer (towards the "low" level) the reference signal then will be set at a level corresponding closely to the existing chemical concentration in the pool at that time. Since this chemical concentration previously had been established by the attendant at the proper or desired level, the control unit automatically will maintain this same level without further intervention by the attendant.

The second procedure requires the attendant to initially set the potentiometers 52 and 114 to their standard, mid-range values and actuate the automatic controller system. Once the system has attained a chemical equilibrium condition in the pool, as determined by an absence of actuation of this system for an extended period, the attendant then tests the pool water with reagent kits to determine if any correction of the potentiometer readings towards either the high or low settings is required. If so, such adjustments are made and the system again permitting to achieve an equilibrium condition after which further testing is made until the desired chemical balance levels are attained within the pool.

Both of these techniques have been successfully tested. Both eliminate the need for read-out meters, calibration charts and electronic calibrators which are required in many other such controller systems.

The system which has been described and illustrated is designed to control both the acid and chlorine levels in a body of liquid, such as a swimming pool, all as set forth. Typically, the pH of a pool changes gradually over a period of weeks while the chlorine demand changes much more rapidly, particularly on sunny days when the pool is in use. For certain applications, such as residential swimming pools, economy of the control system often is more important than the ability to automatically and accurately control both the acid and chlorine levels in the pool. To minimize the cost of the control system for such residential applications a unit which only sensed chlorine demand of the pool and supplied chlorine to the pool in response to such a demand has proven to be quite satisfactory. Such a system is illustrated in FIG. 5.

The system shown in FIG. 5 includes an electronic controller 202 that is physically attached to a "T" pipe fitting 204. Thus, the controller may be easily mounted in a re-circulating water line of an existing swimming pool pump filter and heater system simply by splitting the inlet line 206 and mounting the "T" 204 in that split line in any appropriate fashion. A pump 208 circulates water from the pool 210 through a filter and heater unit 212 to a water return line 214, the water flowing from that line back into the pool.

Controller 202 includes a sensor to determine the level of the chemical desired to be controlled in the water passing through "T" 204. Preferably, this sensor is received within the "T," dashed line 216 illustrating the presence of this sensor within "T" 204.

The circuit incorporated within controller 202 which employs the output of sensor 216 to selectively supply a chemical to the re-circulating pool water is schematically illustrated in FIG. 6. Sensor 216 is electrically connected, through a low pass filter 222 which smooths out noise signals and short term fluctuations in the electrical output of the sensor, to three comparators, comparator 224, 226 and 228. The other input to each of these comparators is connected to a potentiometer 232 by an adjustable contact set 234. These contacts preferably are mechanically ganged together. The potentiometer is connected to a voltage reference source, Vr, such as illustrated in FIG. 4. Thus, a voltage drop occurs across the potentiometer. Contacts 234 electrically tap this voltage drop, supplying three related voltages to comparators 224, 226 and 228, comparator 224 receiving the higher of these voltages and comparator 228 receiving the lower of these voltages. Preferably a manual control of the adjustment of this contact set 234 is provided, knob 236 (FIG. 5) on the front panel of controller 202 permitting the set of voltages applied to the comparators to be adjusted between a high and a low level.

Comparator 226 is connected to potentiometer 232 and through low pass filter 222 to probe 216 in such a fashion that should the output of probe 216 drop below the intermediate voltage level established by the adjustment of potentiometer 232, comparator 226 will in turn produce an output. This output is applied through comparator 242 to a diode 244. Preferably comparator 242 includes a resistor 246 connected as illustrated to impart a desired degree of hysteresis to the system, requiring the output of comparator 226 to be more than some minimum value before a significant potential is applied to diode 244. In this fashion, an intermittent, low level output of this portion of the system to the diode is prevented, thus eliminating any 'chatter' or intermittent output of the control system.

Comparator 224 is connected both to probe 216 and potentiometer 232 is such a fashion that, should the output of the probe exceed some predetermined level higher than that required to actuate comparator 236, comparator 224 conducts, illuminating light 252. This light is physically mounted to radiate from the front panel of controller 202, as shown. Similarly, comparator 228 is connected both to probe 216 and to potentiometer 232 in such a manner that, should the output of probe 216 drop below some lower value, comparator 228 conducts causing light 254 to be illuminated. This light also is mounted to radiate from the front panel of controller 202. These lights visually indicate an excess or out-of-range condition to the operator, thereby providing out-of-range alarms.

As has been discussed, it is often important to limit the amount of chemical dispersed to provide sufficient time for the dispensed chemical to disperse throughout the pool prior to initiating another sensing and dispensing operation. To achieve this objective, the controller shown in FIGS. 5 and 6 incorporates, for example, a digital counter 262 which is connected to the 50 or 60 hz power source of the system. This counter responds to successive cycles of the power source, counting them and producing a succession of outputs on a resistor network 264, causing power to be applied to one after another of these resistors as the count increases until, when a maximum count is achieved, power is applied to all resistors of the network. The count then drops to zero, removing power from all the resistors of the network. Thus, the output of the resistor network appearing on line 266 is a stepped sawtooth waveform which gradually increases from some minimum value to a maximum value, then instantaneously drops to the minimum value, this cycle repeating as the counter increments.

The voltage waveform appearing on line 266 is applied to a comparator 272 together with the output of a potentiometer 274, which potentiometer also is connected to the reference voltage, $V_r$. As a result, appearing on line 276 is a biased version of the sawtooth waveform, the degree of biasing relative to a reference potential being determined by the potential applied to comparator 272 from potentiometer 274. The potential appearing on line 276 is applied through a resistor 278 to diode 244 as well as to light emitting diode 282 and through diode 244 to a Triac 284 and solenoid valve 286.

In operation, normally the positive portion of the sawtooth waveform appearing on line 276 is conducted through diode 244 to ground. However, upon conduction of comparator 242, diode 244 is reverse biased and the potential appearing on line 276 then is applied through diode 282 and Triac 284 to the solenoid valve 286, causing the solenoid to be actuated and the valve opened for the duration of the positive portion of the sawtooth waveform signal appearing on line 276. The positive portion of the waveform is determined, in turn, by the adjustment of potentiometer 274.

Solenoid valve 286 preferably is mounted on the back of controller 202, although it may be mounted at any other point as the controller, such as on one of its side panels as illustrated in FIG. 5 or even be installed at a distance from the controller. This solenoid valve is connected to an input or high pressure line 292 which taps into the water line downstream of pump 208, as shown. The output of the solenoid valve is connected through line 294 to a chemical feeder 296 and, through line 298, preferably to the water line immediately upstream of pump 208 as shown.

In the preferred embodiment, chemical feeder 296 may incorporate dry chlorine, the water flowing through it from line 294 to line 298 the water flow eroding and dissolving this dry clorine, which dissolved chlorine then is introduced into the pool water flowing to the pump and downstream of sensor 216. Of course, in a fashion similar to that illustrated in FIG. 1, solenoid 286 may dispense liquid chlorine to line 298 and thereby to the swimming pool.

As has been noted, once the chlorine level drops to a certain minimum level, solenoid valve 286 is actuated for an interval determined by the extent to which the sawtooth waveform has been clipped by comparator 272. This in turn is determined by the adjustment of potentiometer 274. Preferably, that adjustment is presented to the user on the front panel of the control, an appropriate member of potentiometer 274 there being exposed to permit the user to determine this duty cycle or this system. For example, if potentiometer 274 is adjusted to clip a substantial part of the sawtooth waveform output of resistor network 264, the solenoid valve 286 will be actuated for a relatively short interval followed by a longer non-dispensing interval permitting the dispensed chemical to disperse throughout the pool.

An important feature incorporated in the controller circuit illustrated in FIG. 6 is graphically illustrated in FIG. 7. Because the potentials applied to controllers 224, 226 and 228 are all determined by the ganged contacts 234 of potentiometer 232, the desired chlorine level as well as the high and low level limits are adjusted in unison. For example, when using dry chlorine, typically a probe output on the order of 650 millivolts corresponds to the recommended safe level of chlorine in the pool water. Since the control system just described permits the chlorine level to be controlled within a narrow range, it is possible, and desirable, to set the high and low levels at approximately 700 and 600 millivolts respectively. These levels in turn correspond to on the order of 2 parts per million and 0.5 parts per million chlorine in the pool water respectively. They are indicated by the dashed horizontal lines 402 and 404 in FIG. 7, respectively. The output of probe 216 and the chlorine level in the pool, is illustrated by the sawtooth solid line 406. As it indicates, the chlorine level in the pool gradually drops at different rates, depending upon pool usage, environmental factors and other conditions. Upon reaching a given level above the minimum level indicated by dashed line 404, comparator 242 conducts reverse biasing diode 244 and causing solenoid valve 286 to open. After sufficient chlorine is dispensed to return the output of probe 216 to a level sufficient to terminate the output of comparator 226, the dispensing operation is terminated. This cycle is repeated each time the output of probe 216 drops to a given, low level, the rate at which this decrease occurs being determined by the factors previously noted.

Many of the advantages set forth for the control system illustrated in FIGS. 1 and 4 are equally true for the control system illustrated in FIGS. 5 and 6. Moreover, the control system illustrated in FIGS. 5 and 6, while quite economical and simple to install, also achieves an accurate and close control of the chlorine level in the pool, thereby minimizing chlorine consumption and, in a very real fashion, enhancing enjoyment of the pool. A control system incorporating the foregoing principles also has been constructed and installed, confirming its operation and suitability especially for smaller pools.

Preferred embodiments of the system and adjustment procedures have been described. Variations will be apparent to those skilled in this art. Accordingly, the scope of the invention now will be set forth in the following claims.

I claim:

1. A system for controlling the chemical balance within a given range of a swimming pool of water having at least a recirculating water line and a pump in the recirculating water line which, when operating, forces water through the recirculating water line, the system including:
   a least one sensor in the recirculating water line for continuously determining the chemical balance of the pool and for producing an output indicative of that chemical balance:
   means for dispensing a chemical to the pool downstream of the sensor to adjust the chemical balance of the pool towards the desired balance; and
   control means, said control means comprising:
      (i) comparator means for comparing the output of the sensor with a predetermined value and producing an output when the output of the sensor departs from said predetermined value; and
      (ii) timing means coupled to said dispensing means and to said comparator means for controlling the duty cycle to said dispensing means such that when actuated by the output of said comparator means, the duty cycle of said dispensing means may be selectively limited, the timing means comprising means for generating a cyclic waveform, regulating means for regulating the timing means to provide a dispensing time period from only a small fraction of the duty cycle to substantially the entire duty cycle comprising means for clipping the cyclic waveform produced by said generator means, means for applying the clipped cyclic waveform to the dispensing means in such a manner that when the comparator means produces an output, it causes the dispensing means to dispense for only a portion of the cyclic waveform.

2. A system as set forth in claim 1 wherein said timing means comprises a first timer, and said regulating means comprises a second timer, said first timer being coupled to said dispensing means and to said comparator means and limiting the dispensing cycle to a relatively short dispensing time interval, and said second timer coupled to said first timer so as to prevent said first timer from activating said dispensing means for a relatively longer time interval whereby any chemical added to the pool is allowed to disperse prior to the dispensing of any additional chemical.

3. A system as set forth in claim 1 including means connected to the regulator means for varying the extend of clipping of the cyclic waveform and thereby the duty cycle of the system.

4. A system as set forth in claim 1 including means to detect and signal an out-of-range condition of the chemical balance of the pool, said means centering the out-of-range detection about the predetermined value.

* * * * *